H. HESS.
MACHINE FOR MEASURING FRICTION.
APPLICATION FILED AUG. 11, 1909.
1,117,187.
Patented Nov. 17, 1914.
5 SHEETS—SHEET 5.
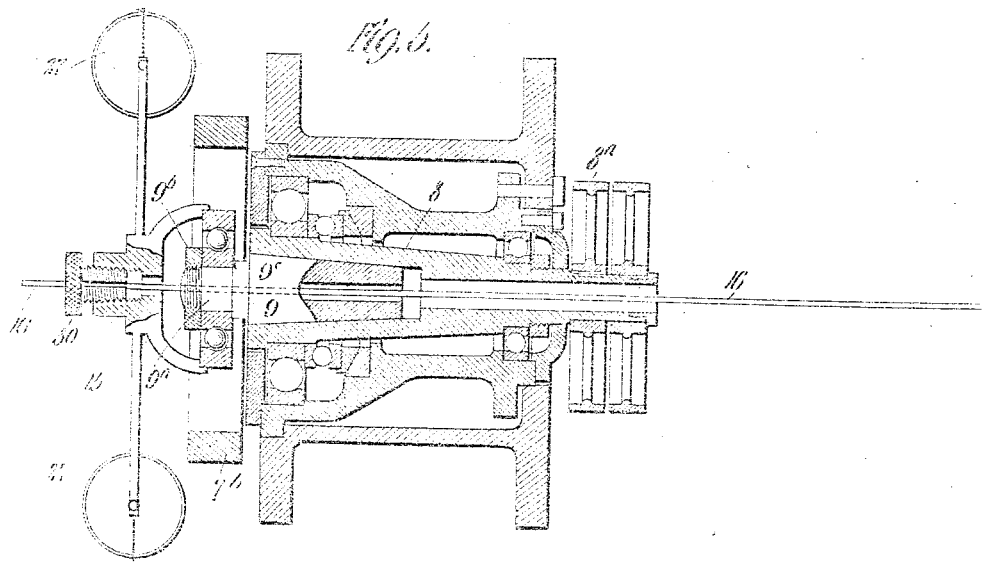
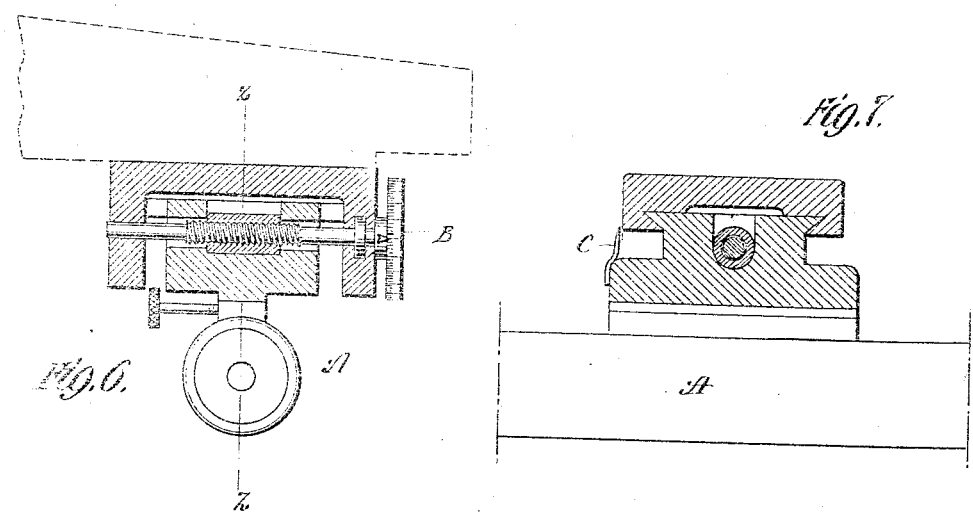
Witnesses:
Inventor
Henry Hess
By his Attorneys
Rogers & Kennedy

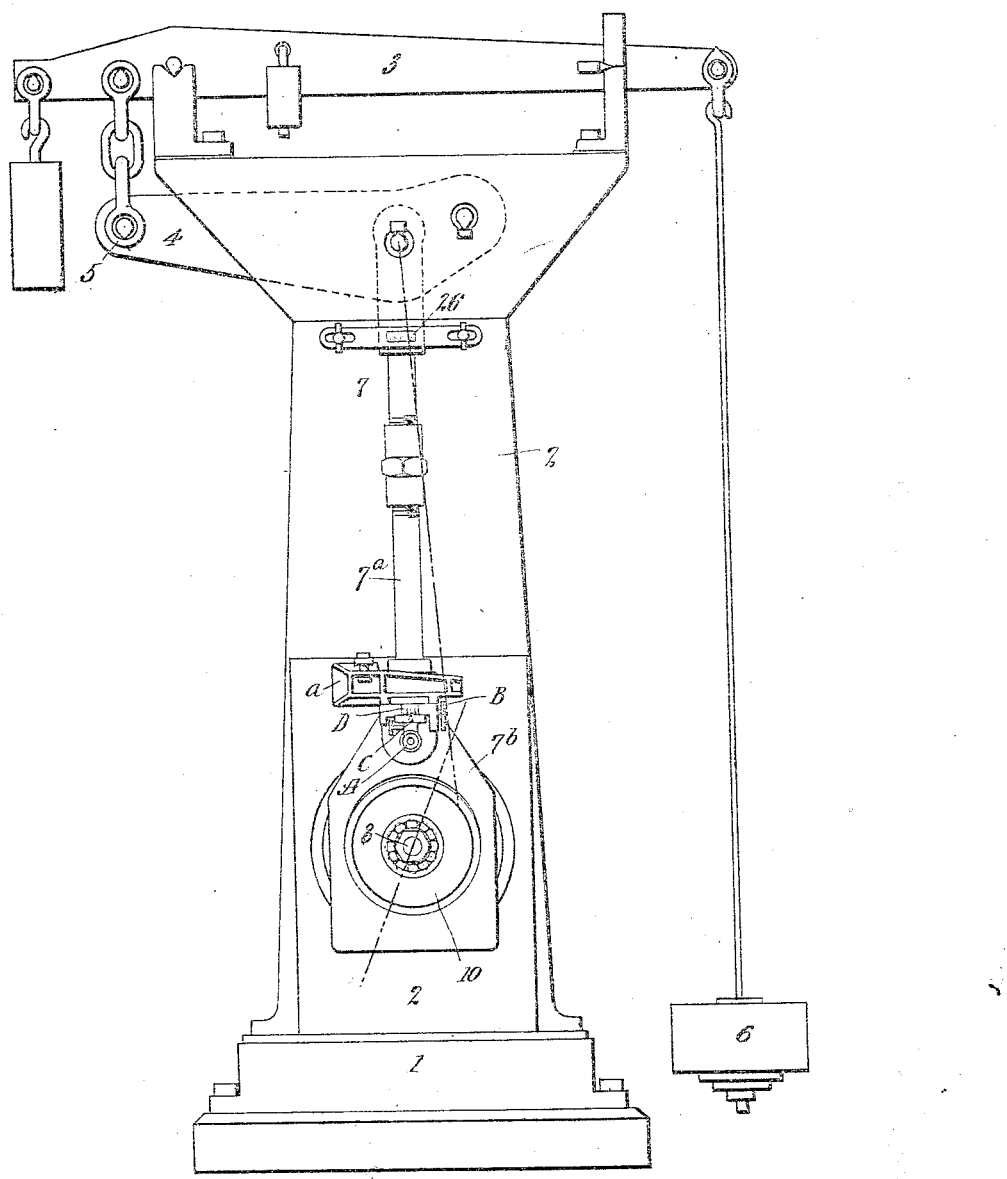

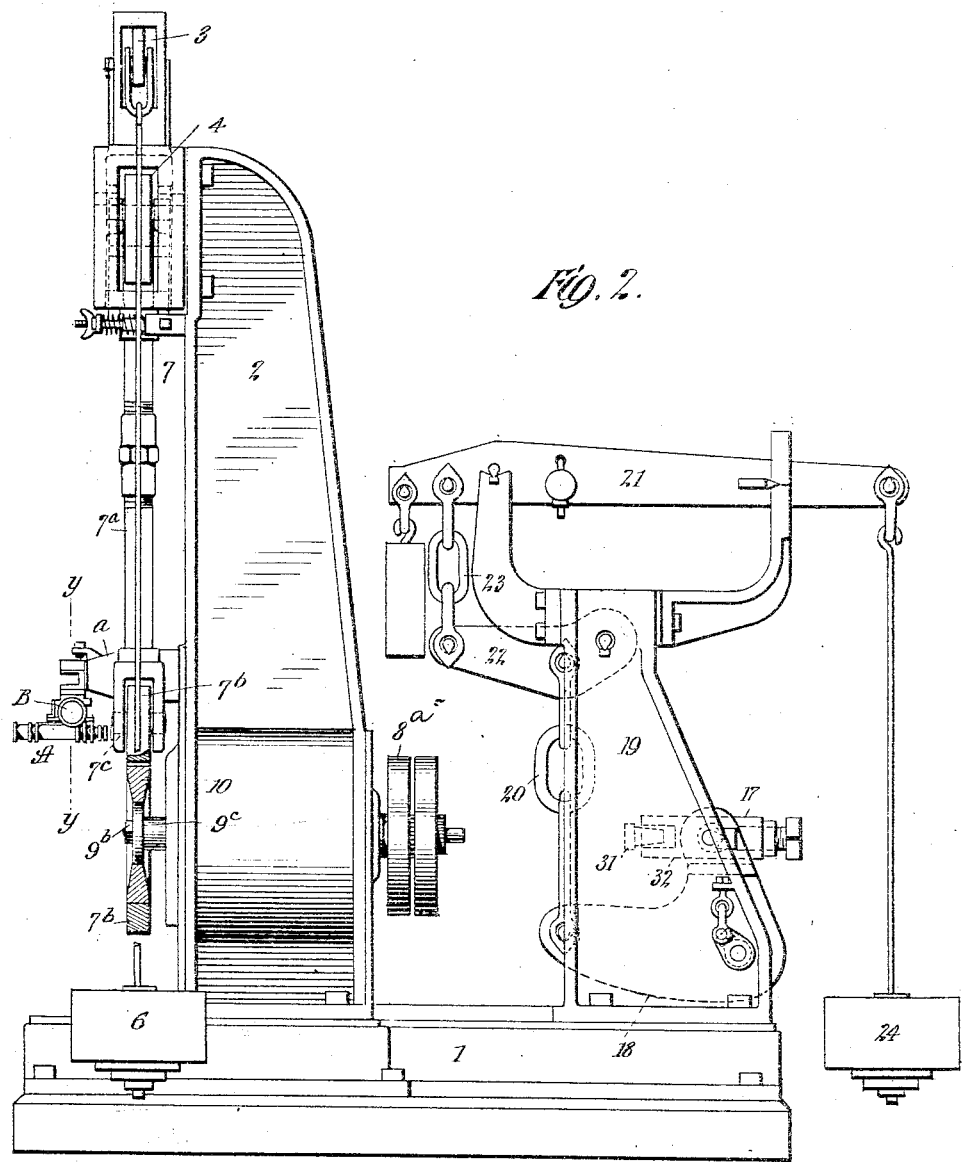

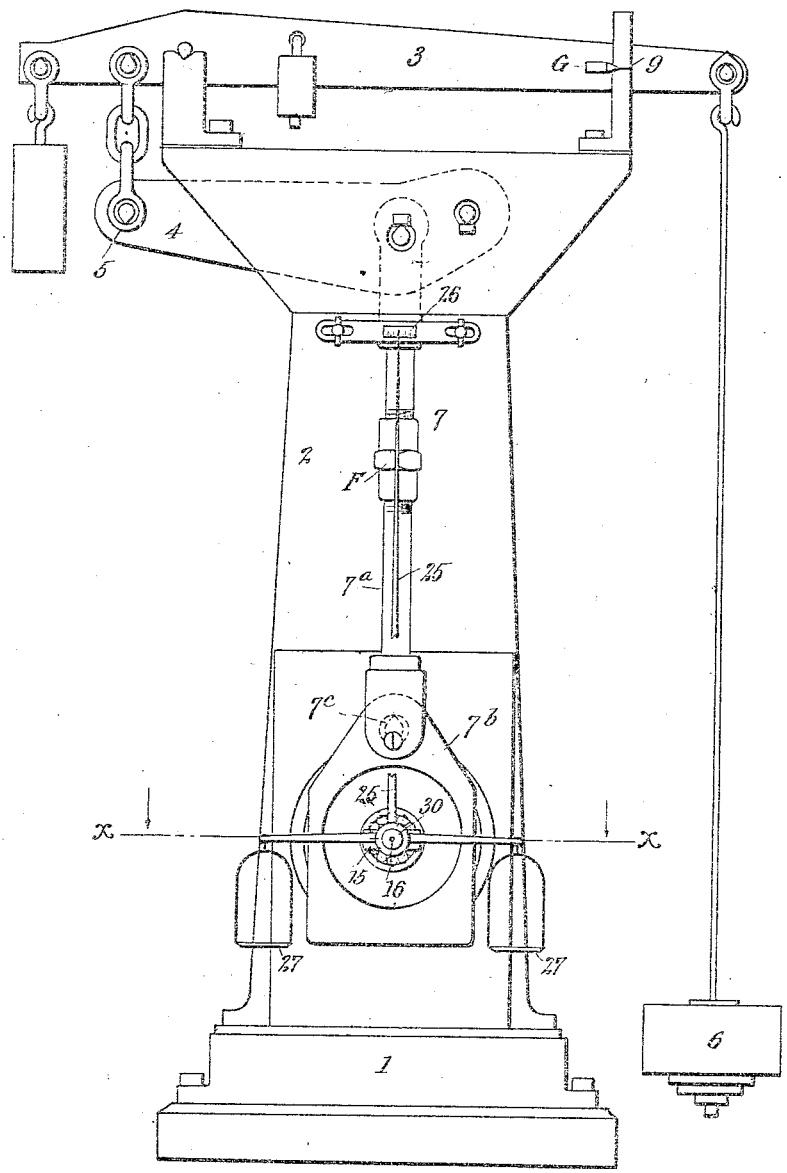

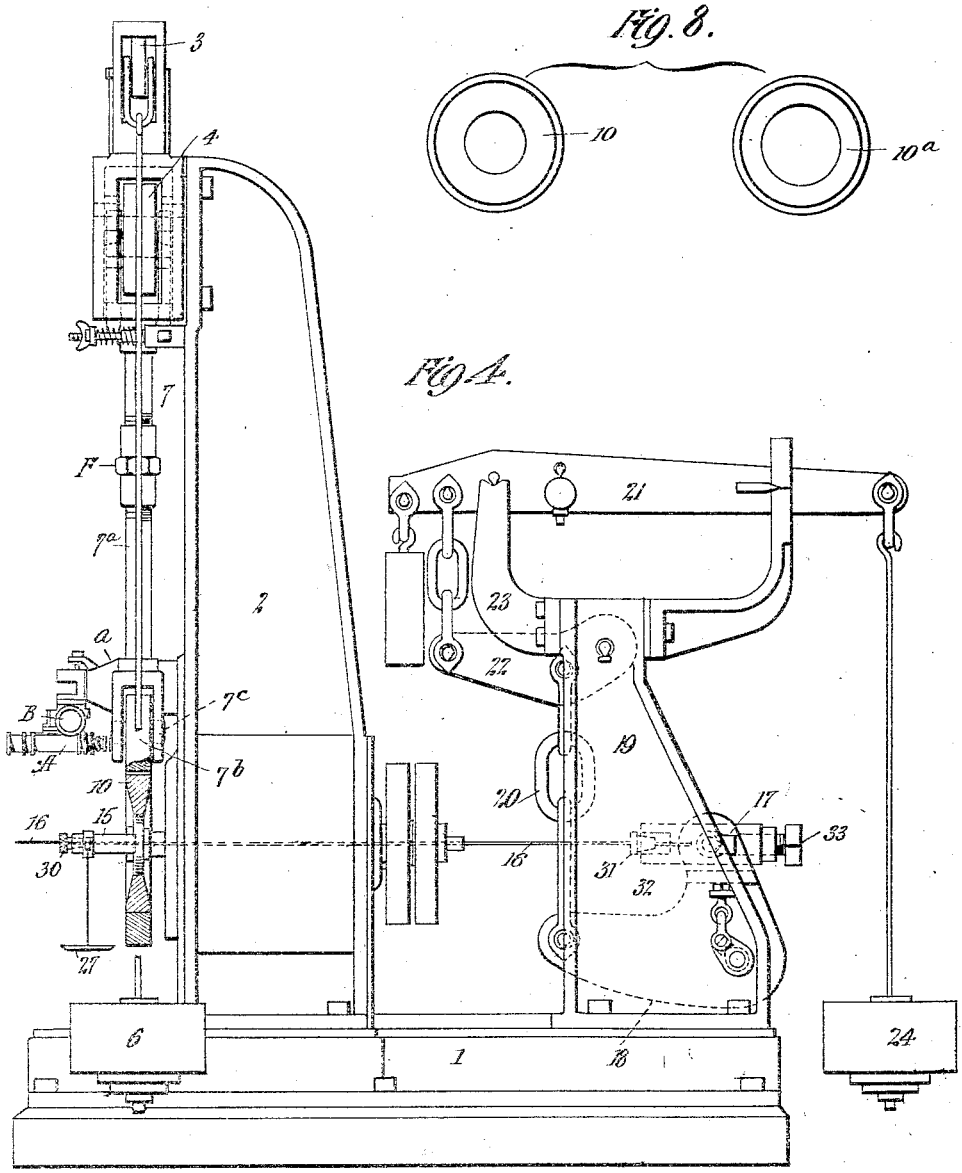

UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

MACHINE FOR MEASURING FRICTION.

1,117,187.   Specification of Letters Patent.   Patented Nov. 17, 1914.

Application filed August 11, 1909.   Serial No. 512,235.

*To all whom it may concern:*

Be it known that I, HENRY HESS, a citizen of the United States, residing at Wawa, in the county of Delaware and State of Pennsylvania, have invented certain new and useful Improvements in Machines for Measuring Friction, of which the following is a specification, reference being had therein to the accompanying drawing.

This invention relates to mechanism for measuring friction between relatively moving parts, and more particularly in bearings of the type comprising inner and outer casing members and intermediate rolling elements, and the invention consists of improved mechanism comprising means for giving support to the parts to be tested, means for moving one of the parts, and means for subjecting the other part to load.

More specifically, and as applied to bearings comprising inner and outer casing members and intermediate rolling elements, the mechanism embodying my invention comprises means for supporting the bearing to be tested, means for rotating one of the casing members, and means for subjecting the other member of the bearing to load, acting either radially or endwise relative to the axis of rotation, or in directions oblique to said axis, the friction between the parts of the bearing, which under these conditions will tend to rotate the loaded member, being measured and determined by the degree of movement of said loaded member.

In the accompanying drawings:—Figure 1 is a front elevation of a machine embodying my invention and showing the same adapted to subject a bearing to radial loads. Fig. 2 is a side elevation of the same with parts in section. Fig. 3 is a front elevation showing the mechanism adapted to subject a bearing to thrust loads. Fig. 4 is a side elevation showing the machine adapted to subject the bearings to both radial and thrust loads. Fig. 5 is a horizontal section on the line $x$—$x$ of Fig. 3. Fig. 6 is a vertical section on the line $y$—$y$ of Fig. 2. Fig. 7 is a section on the line $z$—$z$ of Fig. 6. Fig. 8 is a plan view of details.

Referring more particularly to Figs. 1 and 2, which show the machine adapted for the determination of friction in bearings where the latter are subjected to radial loads only, 1 represents a bed-plate, from which rises a standard or column 2, supporting at its upper end a system of weighing levers, comprising a main horizontal beam 3, fulcrumed between its ends on the standard, and an underlying horizontal lever 4, fulcrumed at one end on the standard and jointed at its opposite end to the main beam at one side of the fulcrum of the latter by means of a link 5, a weight 6 being adapted to be applied to the opposite end of the same so as to exert an upward pull on the lever 4. Pivotally connected with the lever 4, preferably by a knife edge, is a depending tension member 7, adapted at its lower end to be engaged with the bearing to be tested, which tension member comprises an upper vertical rod $7^a$ and a lower plate $7^b$, jointed together end to end, as at $7^c$, the rod having its lower end forked for this purpose so as to embrace the upper end of the plate, which latter is formed with an opening to receive a knife edge carried between the forks of the rod.

The bearing to be tested is mounted fixedly in any suitable manner on the forward end of a horizontal spindle 8, mounted for free rotation in the standard 2, and provided with a fast pulley $8^a$ adapted to be driven from any suitable source of power, and preferably in opposite directions, for the purpose presently to be described; and in order that bearings of different sizes may be applied to the spindle, the latter is formed at its forward end with a taper bore to receive a taper arbor 9, having on its end a cylindrical stud $9^a$ to fit the bore of the inner casing member of the bearing, the latter being held thereon by means of a nut $9^b$, which clamps the bearing ring tightly and firmly against a shoulder $9^c$ on the arbor. A number of these arbors may be provided all of the same diameter to fit the taper bore in the spindle, but having studs of different sizes to adapt different sized bearings to be applied to the spindle.

In order to adapt the plate $7^b$ to be connected with bearings of different sizes carried by the spindle, a number of disk-plates 10, $10^a$, as shown in Fig. 8, are provided of a uniform external diameter to adapt any of them to be fitted tightly within an opening in the plate $7^b$, the bores of the different disks varying in size to adapt them to fit the exterior of the outer casing members of different sized bearings to be tested.

In setting the bearing to be tested in place in the machine, the proper arbor for the size of the bearing, is fitted in the taper bore of the spindle and the inner casing element of the bearing slipped over the stud, the clamping nut being tightened up so as to hold it firmly and fixedly in position. The appropriate disk is then fitted tightly over the outer casing element, and said disk seated in the opening in the plate 7ª, the bore of the latter being so formed that there will be a slight clearance between the plate and disk at the upper side, and the fit of the parts being sufficiently close and tight on the lower side to cause the plate to be moved with the outer casing member as the latter shifts circumferentially when the inner casing member is rotated. With the parts assembled in this manner, and the beam 3 properly weighted to subject the outer casing element to the load desired, the weight will tend, through the system of weighing levers, to maintain the parts 7ª and 7ᵇ of the tension member in alinement. When now the spindle carrying the inner casing member is rotated, the friction in the bearing will cause the outer casing member to be shifted circumferentially, which carrying the plate 7ᵇ with it, will cause a deflection of the tension member, as indicated to an exaggerated degree by dotted lines in Fig. 1. The journal friction in the bearing being the deflecting force, is balanced by the weight 6, acting through the weighing beam, and the degree of deflection being determined, the amount of friction may be computed. The degree of deflection may be determined in any suitable manner, but in order to insure accuracy and certainty, I propose to employ a microscope A carried by a bracket a, fixed to the standard 2, the bracket being provided with horizontal guides in which the microscope is mounted so as to be adjustable horizontally by means of a micrometer screw B, mounted in the bracket and threaded to the tube of the instrument. The eye-piece of the microscope is provided with cross-hairs adapted by the horizontal adjustment of the tube to follow a reading line on the front face of the rod 7ª as the latter is deflected, and the degree of deflection is determined by a pointer C carried by the microscope and adapted to be read in connection with a scale D on the bracket.

In Figs. 3, 4 and 5 I have shown my improved machine of a form adapted to subject the bearing to end thrust loads and adapted to indicate the friction. Here it will be seen that the bearing to be tested, supported and rotated as in the manner just described, has its outer casing member firmly and tightly engaged by a yoke 15, to which is connected centrally a torsion member in the form of a horizontal wire 16, fixed at its forward end to the yoke and passing through openings in the arbor and spindle, with its rear end fixedly connected with the vertical limb 17 of an upright elbow lever 18, fulcrumed in a standard 19, rising from the bed-plate 1 at the rear end. The other limb of the elbow lever is connected by means of a vertical connection 20 with a system of weighing levers, comprising a main horizontal beam 21, fulcrumed between its ends in the standard, and a horizontal lever 22, fulcrumed at one end in the standard and jointed at its opposite end by a connection 23 to the end of the beam, and connected also with the connection 20, before alluded to, a weight 24 being applied to the beam and acting through the parts described to pull rearwardly on the torsion wire. As a result of this construction, the outer casing member of the bearing will be subjected to pressure or thrust acting endwise, that is, in the direction of the axis of rotation of the bearing, and the circumferential movement of the casing member, due to the friction when the inner member is rotated, will place the wire 16 under torsional strain, which will be resisted by the pull on the wire exerted by the weight through the system of weighing levers, with the result that the friction in the bearing will be balanced by the torsional resistance of the torsion member. In this case the degree of movement of the casing member is measured preferably by means of a long pointer 25 fixed to the center of the yoke and adapted to be read in connection with a scale 26 on the standard 2 near its upper end, from which readings the proper computation may be made to determine the degree of friction relative to the size of the bearing, its load, etc. In order to measure the friction directly, the yoke has attached to it a delicate balance with weighing pans 27, so that by loading the pan which has been elevated by the movement of the yoke, the amount of weight necessary to restore the balance of the parts measures the degree of friction which caused the deflection. It is important in this mechanism, where the load is applied by a torsion wire or member, that the same be held firmly and fixedly at its ends in the yoke and elbow lever respectively, so that there will be no liability of twisting or slipping relative to said parts. This is conveniently effected by means of taper clamping screws 30 and 31, the former threaded in the yoke, and the latter in a frame 32, carrying a horizontally movable notched block engaging a knife-edge on the vertical limb of the elbow lever. The notched block is acted on by a screw 33 tapped in the rear end of the frame, so that the proper adjustments of the parts may be made to correct any inaccuracies. The yoke is engaged with the outer casing member of the bearing preferably by notching the ends of its two limbs and applying it by a driving fit.

It will be of course understood that when the mechanism is employed for measuring friction under thrust loads only, as just described, the tension member and its system of weighing levers, first described, are not employed, it being but necessary in order to render these parts inoperative to remove the disk plate 10 from the plate 7ᵇ, so that the latter will hang idly and loosely around the bearing being tested for end thrusts.

It is also obvious that when the mechanism is employed for testing radial loads only, as first described, the other mechanism for testing end thrust loads is made inoperative.

In order that the friction may be measured when the bearing is subjected to both radial and thrust loads, thereby bringing about a component thrust pressure acting obliquely with relation to the axis of rotation, I propose to employ both mechanisms in combination and simultaneously, as shown in Fig. 4, where it will be seen that the outer casing member of the bearing is acted on both by the tension member 7, to apply radial loads, and by the torsion member, to apply thrust loads, and the total friction due to the combined load is then measured by determining the deflection of the tension member through the aid of the microscope, a correction being made for the torsional resistance of the thrust applying wire, as this affects slightly the amount of deflection.

I am aware that it has been proposed in the determination of friction under radial loads, to apply the load to the bearing member by means of a compression strut. My invention, where the load is applied by a tension member, possesses advantages over such known constructions, in that the maximum of loads may be applied without the use of heavy or cumbersome parts which would be necessary in the use of a compression member.

As shown in Fig. 3, the rod 7ᵃ of the tension member is in two parts connected by a threaded turnbuckle 1ᶠ, so that when the bearing to be tested is in place and the proper weights hung, the turnbuckle may be adjusted to effect a proper balance of all the parts, which balance will be indicated by a pointer G on the beam 3 when it lines up with a balance mark g on an arm on the upper end of the standard 2.

In order that any inaccuracy in the initial relative positions of the parts of the tension member may not increase or decrease the apparent deflection reading, the inner casing member of the bearing may be rotated in both directions for each test, the arithmetical mean of the two readings giving the correct one.

I have in the accompanying drawings and the foregoing description illustrated and described the form of mechanism which I prefer to adopt to secure the results desired, and which have been found in practice to answer to an admirable degree the ends to be obtained, but I desire to be understood that the invention is not limited to any specific form or arrangement of the parts except in so far as such limitations are specified in the claims.

Having thus described my invention, what I claim and desire to secure by Letters Patent of the United States is:—

1. In a machine for measuring friction between relatively moving parts, the combination of a tension member adapted to apply load to one of the parts and capable of being deflected from a neutral position, means for moving the other part, whereby the initial friction between the parts will deflect said tension member from the neutral position, and means for determinately measuring directly the degree of deflection of the said tension member.

2. In a machine for measuring friction between relatively moving parts, the combination of a tension member adapted to apply load to one of the parts and capable of being deflected from a neutral position, means for moving the other part, whereby the initial friction between the parts will deflect said tension member, a graduated member, and means for reading directly the degree of deflection of the said tension member in connection with said graduated member.

3. In a machine for measuring friction in bearings, the combination of a tension member comprising two sections jointed end to end in line with the longitudinal axes of the said members, and one adapted to be connected with the outer casing member of the bearing, means acting on the other section of the tension member and tending to yieldingly extend said sections, and means for rotating the inner casing member of the bearing.

4. In a machine for measuring friction in bearings, the combination of a plate provided with an opening encircling and adapted to be connected with the outer casing member of the bearing, a rod jointed to the plate within the plane of the same, means acting on the rod and tending to extend the plate and rod, and means for rotating the inner casing member.

5. In a machine for measuring friction in bearings, including casing members the combination of means for applying load to one of the casing members in the direction of the axis of rotation of the bearing, means for rotating the other casing member of the bearing, and means for measuring the degree of initial frictional deflection of the loaded casing member.

6. In a machine for testing bearings including casing members, the combination of means for supporting the bearings, a torsion member adapted to be connected with one of the casing members of the bearing, means for subjecting said torsion member to strain, and means for rotating the other casing member of the bearing.

7. In a machine for testing bearings including casing members, the combination of means for supporting the bearing, a yoke adapted to be connected with one of the casing members of the bearing, a torsion member connected with the yoke, means for subjecting the torsion member to strain, and means for rotating the other casing member of the bearing.

8. In a machine for testing bearings including casing members, the combination of means for supporting the bearing, means for applying a pressure component to one of the casing members of the bearing in a direction oblique to the axis of rotation of said bearing, and means for rotating the other casing member of the bearing.

9. In a machine for testing bearings including casing members, the combination of means for supporting the bearing, means for applying radial pressure to one of the casing members of the bearing, means for applying end pressure to said casing member, and means for rotating the other casing member of the bearing.

10. In a machine for testing bearings including casing members, the combination of means for supporting the bearing, a tension member adapted to apply a radial load to one of the casing members of the bearing, a torsion member adapted to apply thrust load to said casing member, and means for rotating the other casing member of the bearing.

11. In a machine for testing bearings including casing members, the combination of means for supporting the bearing, a torsion member adapted to be connected with one of the casing members of the bearing, means for subjecting the torsion member to strain to apply thrust load to said casing member, means for rotating the other casing member of the bearing; whereby the loaded casing member will be deflected and the torsion member twisted, and means for determinately weighting the loaded casing member in opposition to its deflection to restore the balance.

In testimony whereof I have affixed my signature in presence of two witnesses.

HENRY HESS.

Witnesses:
 MARY M. CALLA,
 A. THEO. BRUEGEL.